March 5, 1940.　　　H. L. STRUBE　　　2,192,246

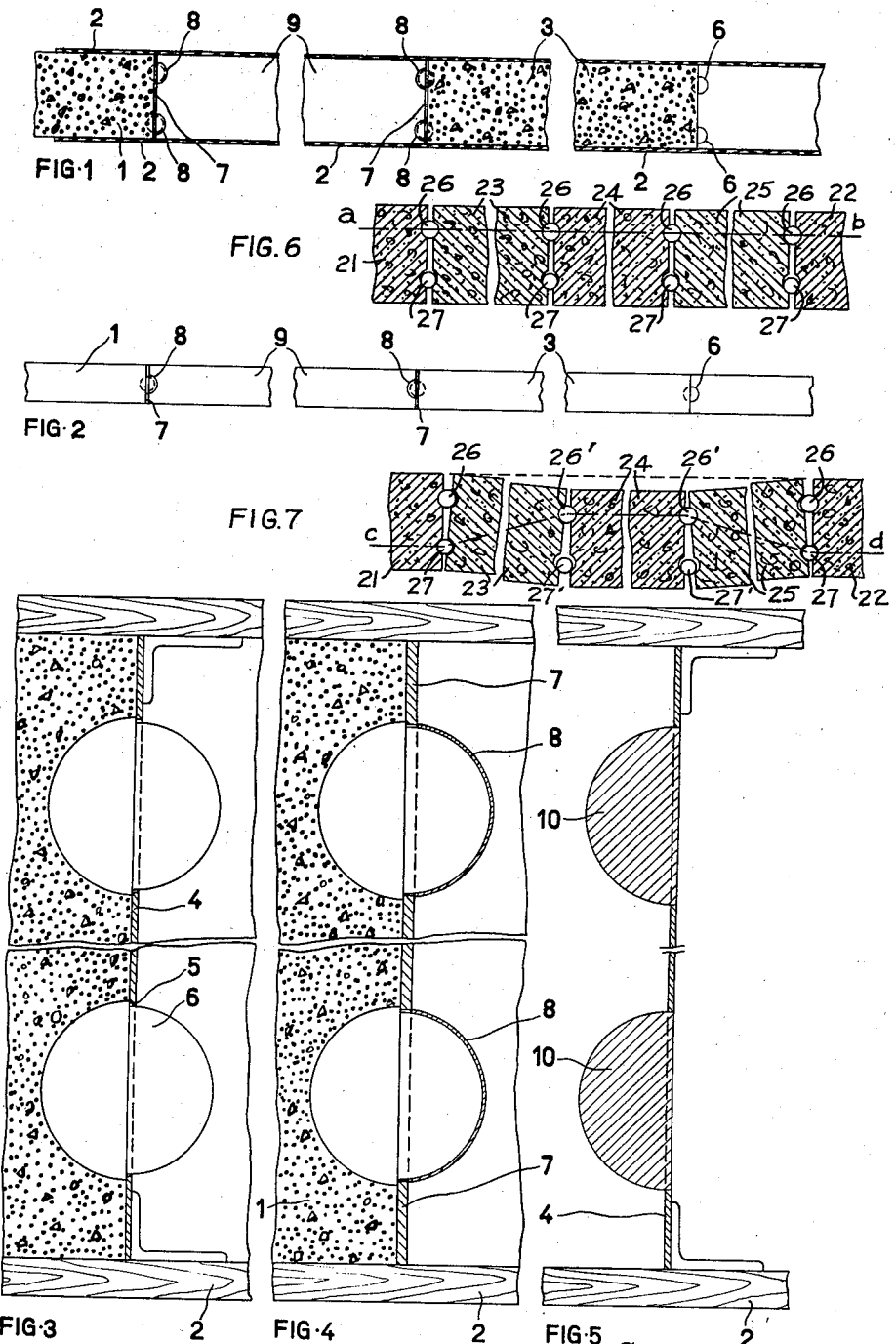

HIGHWAY CONSTRUCTION

Filed Dec. 8, 1936　　　2 Sheets-Sheet 2

Inventor
Hendrik Lodewijk Strube
by Michaelis & Michaelis
Attys.

Patented Mar. 5, 1940

2,192,246

UNITED STATES PATENT OFFICE 2,192,246

HIGHWAY CONSTRUCTION

Hendrik Lodewijk Strübe, Amsterdam, Netherlands, assignor to N. V. Industrieele En Bouwmaterialenhandelmaatschappij "Iboma," Amsterdam, Netherlands Application December 8, 1936, Serial No. 114,742
In the Netherlands December 10, 1935

15 Claims. (Cl. 94—13)

My invention relates to highway construction and more especially to means for connecting paving blocks, curbstones and the like in such manner that although being connected with each other in juxtaposition they are free to a certain extent to move relatively in all directions.

According to this invention the blocks to be connected are formed, on their sides facing each other with hemispherical cavities or indentures, the cavities or indentures in the abutting face of one block being exactly alined with the corresponding cavity or indenture in the abutting block, when the blocks have been placed in juxtaposition. In these cavities or indentures I insert connecting members having the form of spherical bodies (balls) or short cylinders with rounded-off ends, which approach the spherical form, these connecting members being formed from a material of sufficient hardness, such as concrete, and partly projecting from one and enter the corresponding cavities or indentures of the abutting block. I insert between the blocks balls or the like of a diameter such that the adjoining faces of the two blocks do not contact with each other.

The connecting members, such as one or a plurality of balls or short cylinders of hard material, such as concrete, rounded off at the ends, which are inserted in registering cavities of the blocks to be connected, are for the greater part enclosed between the blocks, while leaving a gap between them, which may be filled with some suitable spacing material or with an elastic packing material, either one or both adjoining structural members being free to somewhat turn about the center points of the ball or cylinder connections without the adjoining surfaces of the members coming in contact with each other and being damaged thereby.

I may also arrange in the gaps a metallic protective member, for instance a hemispherical steel cap, the elasticity of which allows the pressure to be uniformly distributed on the adjoining parts of the members, thereby preventing local overstressing from arising. In order to prevent the structural members connected by a ball-shaped element inserted between them from turning about an axis extending perpendicularly to the adjoining faces, I may form one of these faces with a projection and the adjoining face with a corresponding notch.

In cases where a longer row of structural members, connected with each other according to this invention, is used, for instance in the case of curb stones it is of importance, that when one or several stones should be displaced or sag, these stones are prevented from coming in contact and damaging each other. To this end I form the adjoining faces of the stones or blocks with a certain number, such as for instance six plane surfaces, which taper from the cavity, in which the connecting ball is seated, towards the side of the members and form a six-sided pyramid, so that in the correct relative position of two adjoining stones the visible gap between two surfaces is larger than the gap between diametrically opposed surfaces, whereby, if the stones should turn about the center point of the ball, this gap cannot be closed, since at the adjoining places gaps are closed, thereby rendering it impossible for the stone to continue turning.

In certain cases, for instance when applying my invention to curb stones, it will be useful to connect two adjoining stones by means of two superposed ball members, the upper wall being enclosed between the two members, while the lower ball is enclosed in the hemispherical cavities with a certain clearance, for instance of 2 mm. This arrangement offers the advantage that if one of the curb stones should sag, the pressure line will wander towards the lower ball. I thus obtain that for a certain length of stones the adjoining end faces cannot come in contact with each other, if one of the stones should sag.

In end walls which are required to offer resistance to horizontally acting forces, two balls arranged in series in the same horizontal plane should be used for the connection.

Preferably the cavities destined to receive the balls or short cylinders are surrounded by reinforcing material.

I may apply this invention also to a new kind of road covering, consisting of a plurality of blocks, preferably of even and uniform size interconnected, in such manner, that the road covering forms a coherent load supporting unit, the individual parts of which remain relatively movable to a certain extent. Such road covering may for instance be formed by cubic stones or bricks of equal size arranged in staggered relation and juxtaposition with their longitudinal edges extending across the road and at right angles to the direction of travel of the road vehicles, the longitudinal side faces of these stones or bricks being formed with two hemispherical cavities each, the cavities of adjoining stones or bricks registering with each other and enclosing between them ball-shaped connecting and spacing members of resistive material such as concrete. The narrow gaps between the members render it possible to place the road covering in position in a simple manner and to unite them to form a unitary load supporting cover.

I may also produce a road cover formed of large sections, each of which forms a self-contained load supporting unit and between the sections I may arrange one or a plurality of stones, plates or the like removable in a simple manner. I am thereby enabled to remove in a simple manner one or several stones belonging to a section and to replace them by fresh stones. I may for instance construct the road cover in two halves of equal width extending in juxtaposition in the direction of travel of the road, arranging between the two halves a row of stones or plates which can be removed partly or altogether in a simple manner and which may at the same time form a border line between the left hand and the right hand half of the road, more especially if such middle row differs in color from the two halves of the road separated by it.

In order to enable the road covering to be exposed without danger to great changes of temperature, I may provide cavities in the members which are larger in the longitudinal than in the transversal direction. The balls arranged in such cavities are then free to move in these cavities relative to the stone members and thus allow the stones to slightly be displaced in a direction at right angles to the direction of travel, these displacements sufficing to compensate any expansions or contractions brought about by changes of temperature.

A road covering according to my invention also offers the great advantage that in case that the road bed should be defective and sag in certain places, it is now rendered possible to lift again the covering in a simple and inexpensive manner. I may for instance bore vertical holes in one or several places, insert in such hole a bar formed with a barbell hook or the like and thus lift the sagged part of the cover. I may then insert in the cavity forming below the cover sand, either dry or moist and may then allow the cover to sink back onto the sand filling. In this process I may use a small structure, from which is suspended a rod formed with grapple hooks. This rod is then lowered into the hole and pulled up again, the grapple hooks gripping the cover, whereupon sand or the like is injected through the same or an adjoining hole, the holes being thereafter filled with mortar or the like.

I may of course construct the road covering from stones, all or some of which are formed with a vertical hole or with vertical notches, through which the flattened end of a rod may be inserted, until the rounded part of the rod has entered the adjoining notches, whereupon the projecting end will grip the adjoining stones from below, thereby exerting a pull on the road covering in this section.

In the drawings affixed to this specification and forming part thereof several embodiments of my invention are illustrated diagrammatically by way of example.

In the drawings

Fig. 1 is a plan view of a row of curb stones, each formed in situ from shaked concrete, the adjoining stones being connected by a pair of balls.

Fig. 2 is a corresponding side elevation with the sheetings removed.

Figs. 3 and 4 are horizontal sections, drawn to a larger scale, of the adjoining portions of a pair of stones connected by the balls and showing two consecutive stages of manufacture, while Fig. 5 is a similar section of a modified form.

Fig. 6 is a similar section of a row of curb stones, in which a pair of superposed balls is used to connect adjoining stones, Fig. 7 again illustrating the same row of curb stones in sagged position.

Figure 9:
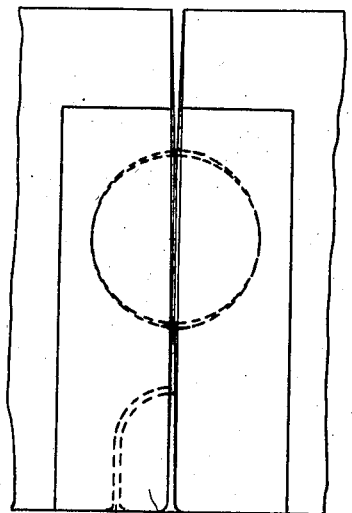
Fig. 9 shows the stone of Fig. 8 and the adjoining stone in their relative positions.
Figure 8:
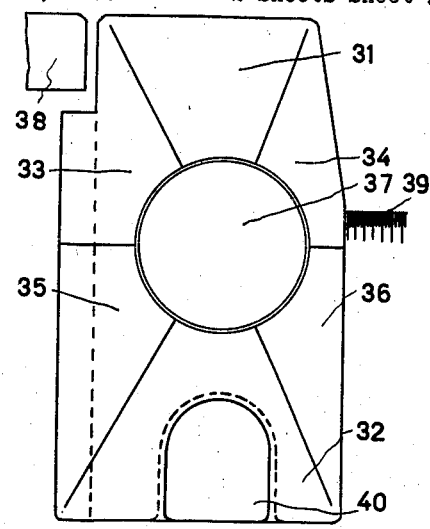
Fig. 8 is an end view of a curb stone, drawn to a still larger scale, with a connecting ball mounted in place in a hemispherical cavity formed in the end face which has the form of a hexagonal pyramid, a projection being formed below the hemispherical cavity to enter a corresponding notch in the adjoining stone.

Referring to the drawings and first to Figs. 1 and 2, I is a ready made piece of a row of curb stones, which shall be completed by the addition of further stones of predetermined length. To this end a form or sheeting 2 is provided in which there is first formed a band 3 of shaked concrete in the following manner: At predetermined points spaced in correspondence with the length of the bordering member steel partitions 4 are mounted in place between the sheetings (Fig. 3) each partition being formed with two round holes 5, in which are mounted concrete balls 6, each ball consisting of two halves slightly differing in diameter, so that one half of the ball is somewhat larger than the other. The balls 6 are inserted in the holes 5 by their smaller half, the diameter of the holes being somewhat smaller than that of the larger half of the ball. Now the concrete destined to form the piece 3 is placed between the sheetings, the balls 6 being held in their predetermined position in the holes 5 by the pressure exerted upon them by the concrete. After setting of the concrete the partitions are removed and from the concrete wall of the member thus formed project the two halves of the balls, as shown in the right hand part of Figs. 1 and 2. Now cardboard strips 7 with holes or perforations are placed on the surface, from which project the balls, and papier-mâché caps 8 with somewhat thinner walls, as shown in Fig. 4, are placed on the balls. In the space between the preformed part of the bordering band and the freshly formed member the two end faces are now covered by strips 7 and caps 8. Into this part is now poured fresh concrete and another member is formed between the members 1 and 3 which is formed with a connection according to this invention. The space left for the formation of this member is marked 9 in Figs. 1 and 2.

The papier-mâché caps serve to prevent the hemispherical connecting member from adhering to the concrete, so that the two adjoining stones are free to slightly turn relative to each other. However since these caps are slightly thinner than the cardboard strips 7, although adjoining stones may turn relative to each other, their adjoining faces will not come in contact with each other and will not suffer damage. The caps also allow the adjoining members to expand to a certain extent under atmospheric influences.

Fig. 5 illustrates a modified form with hemispherical molding members 10 forming part of the steel partitions 4. Here the cavities are preformed with the aid of these molding members and in the cavities the preformed balls are secured by means of mortar.

By forming the ends of the stones in a certain manner provision may be made therefor that even if further sagging should occur, the gaps can never be closed altogether.

As shown in Figs. 3 and 9, the end faces of each stone are formed with six plane faces 31, 32, 33, 34, 35, 36, all of which slightly rise from the periphery in the direction towards the cavity. If 39 is the surface of the pavement adjoining the curb and 38 one of the curb stones, 40 is a projection fitting in notch 41 of the adjoining stone. The planes 31 are less inclined than the planes 32. If this part of the stones should sag, as shown in Figs. 6 and 7, the visible gap 28 between the stones 13 and 14 is not closed, since the faces 32, which determine the gaps 29 between the stones 11 and 13 and the stones 12 and 14, would be the first to apply against each other.

In Figs. 6 and 7 are shown two stones 21 and 22 out of a number of stones, three of which (23, 24, 25) are shown intermediate between 21 and 22. The end faces of the stones are formed with two superposed hemispherical cavities each; into the top cavity being inserted a ball 26 jammed between the two cavities, while in the lower cavities are inserted balls 27, which still enjoy a certain play. Here also the adjoining ends of the stones do not touch each other. If sagging should occur as shown in Fig. 7, the stones 23 and 25 will turn as shown on the drawings, whereby the top balls would be released from the embrace, while now the balls 27 will be subjected to pressure. The top balls 26 between the stones 23 and 24 will however remain under pressure, while the balls 27 below them will be left free. The pressure line, which is horizontal in the normal horizontal position of the stones (as shown in dotted lines a—b in Fig. 6) when the stones sag, adopts the form c—d in Fig. 7. This shows that no further sagging can occur as soon as the bottom balls 27 are subjected to pressure and in all cases the joints do not close up and the end faces of the stones cannot suffer damage.

Obviously the new connection according to this invention can be used also in combination with elastic packing materials arranged in the joints, whereby the joints are packed without a certain movable connection between the stones being hindered.

The new mode of connecting stones or blocks according to this invention also offers the advantage that the stones thus connected can turn only about each other and that therefore the joints always remain open.

Figure 10:
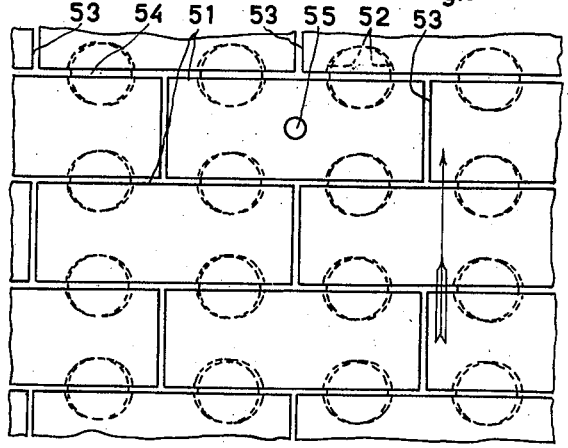
Fig. 10 is a plan view of a modified form of road covering.
Figure 11:
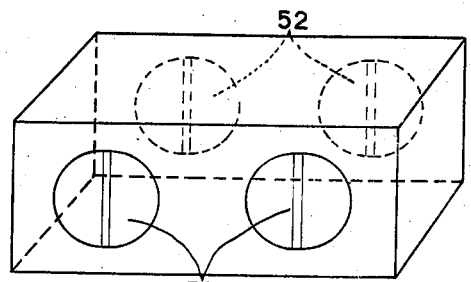
Fig. 11 is a perspective view of one of the stones used in its construction.

The road covering illustrated in Figs. 10 and 11 is formed of stones of even and uniform size arranged in juxtaposition in staggered rows with their long sides extending in the direction of travel of the traffic. Each stone is formed in the two long side faces 51 with two slightly elongated hemispherical cavities 52, the center points of which are spaced about one fourth of the total length of the stone from the short end faces. In the cavities are mounted concrete balls 54. 53 is a hole formed in one of the stones which may be used in lifting this and the adjoining stones in case that the covering should sag. I may for instance form a road covering from stones being 500 mms. in length, 200 mms. in width and 200 mms. in height. The gaps may have a width of 11 mms. and the longitudinal gaps may have a larger horizontal opening which is 2-5 mms. larger than the largest vertical opening. Each ball may have a diameter of 100 mms.

A road covering according to the invention involves a great number of advantages. As all the stones are interconnected the load is distributed over a large surface, even if the load should press on one stone only, and therefore the carrying power is great and the load is also distributed over a large surface of the road bed. The border stones usually required may be dispensed with. This road covering can also adapt itself to larger changes of form in the road bed occasioned for instance by a setting or damming up of the ground, since the stones cannot only execute a certain turning movement, but also a slight displacement.

The road covering has thus become in a certain way elastic and can freely follow changes of form of the ground.

It is particularly useful in application between the rails of street cars and its construction is extremely simple and inexpensive, as is also its up-keep.

Various changes may be made in the details disclosed in the foregoing specification without departing from the invention or sacrificing the advantages thereof.

The term "substantially spherical body" used in the claims is intended to cover both the true balls and the short cylinders with rounded ends mentioned as equivalents in this specification.

I claim:

1. Means for connecting paving blocks, curb stones and the like, comprising two blocks or stones arranged with their adjoining faces separated by a gap so as to remain relatively movable, the adjoining faces of said blocks or stones being formed each with two substantially hemispherical cavities arranged in superposition and two substantially spherical bodies extending between and into the cavities of the two members.

2. Means for connecting paving blocks, curb stones and the like, comprising two blocks or stones arranged with their adjoining faces slightly spaced from each other, the adjoining faces of said blocks or stones being formed each with two substantially hemispherical cavities arranged in superposition and two substantially spherical bodies extending between and into the cavities of the two members, the upper bodies fitting tightly in their cavities, the lower bodies projecting loosely into their cavities.

3. The arrangement of claim 1, in which the adjoining faces of the blocks or stones are formed with planes sloping from the middle towards the sides.

4. The arrangement of claim 1, in which the adjoining faces of the blocks or stones are formed with planes sloping differently from the middle towards the sides.

5. Curb stone arrangement comprising two curb stones separated by a gap so as to remain relatively movable, adjoining faces of said stones being formed each with two superposed substantially hemispherical cavities and two balls of hard ceramic material between said stones projecting into registering cavities of the two stones.

6. The arrangement of claim 1, in which the diameter of the cavity is somewhat larger in the longitudinal direction than in the transversal direction.

7. In highway construction the connection between paving blocks, curb stones or the like, wherein a substantially spherical connecting body inserted between a pair of adjoining blocks or stones projects into registering substantially hemispherical cavities formed in adjoining faces of such blocks or stones, the coacting parts being so dimensioned that in their normal position these faces do not contact with each other and the blocks or stones, when acted upon by pressure normal to their surfaces, are capable of a certain relative movement in all directions about the center point of such spherical body.

8. The combination of claim 7, in which the adjoining faces of a pair of adjoining blocks or stones slope from the center point of the spherical body towards the outer edges, whereby in the normal position of the blocks or stones gaps are formed between these faces.

9. The combination of claim 7, in which two substantially spherical bodies project into two pairs of substantially hemispherical cavities formed in adjoining faces of a pair of blocks or stones.

10. The combination of claim 7, in which two substantially spherical bodies project into two cavities formed in the face of one block or stone and each into a cavity in the faces of two adjoining blocks or stones arranged in staggered relation to said first block or stone.

11. The combination of claim 7, in which two substantially spherical bodies project into two juxtaposed pairs of substantially hemispherical cavities formed in adjoining faces of a pair of blocks or stones.

12. The combination of claim 7, in which two substantially spherical bodies project into two superposed pairs of substantially hemispherical cavities formed in adjoining faces of a pair of blocks or stones.

13. The combination of claim 7, in which two substantially spherical bodies project into two pairs of substantially hemispherical cavities formed in adjoining faces of a pair of blocks or stones, the cavities of a pair of cavities differing in size.

14. The combination of claim 7, in which two substantially spherical bodies project into two pairs of substantially hemispherical cavities formed in adjoining faces of a pair of blocks or stones, the cavities being slightly elongated in one direction.

15. The combination of claim 7, in which two substantially spherical bodies project into two pairs of substantially hemispherical cavities formed in adjoining faces of a pair of blocks or stones, the cavities being slightly elongated in the longitudinal direction of the faces of the blocks or stones.

HENDRIK LODEWIJK STRÜBE.